(12) United States Patent
Nakagaki et al.

(10) Patent No.: US 7,599,376 B2
(45) Date of Patent: Oct. 6, 2009

(54) CONVERTER AND COMMUNICATION CONTROL METHOD

(75) Inventors: Shinya Nakagaki, Osaka (JP);
Toshikazu Inoue, Osaka (JP); Kazuya Kumazaki, Osaka (JP); Mineharu Hattori, Osaka (JP); Tetsuji Ichikawa, Osaka (JP); Nobuo Iguchi, Osaka (JP); Akio Morimoto, Kawasaki (JP); Michio Kusayanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 11/148,753

(22) Filed: Jun. 9, 2005

(65) Prior Publication Data
US 2006/0182125 A1   Aug. 17, 2006

(30) Foreign Application Priority Data
Jan. 31, 2005   (JP) .............................. 2005-022622

(51) Int. Cl.
*H04L 12/28* (2006.01)
(52) U.S. Cl. ..................................... 370/395.6; 370/466
(58) Field of Classification Search ........................ None
See application file for complete search history.

(56) References Cited

U.S. PATENT DOCUMENTS

| 5,732,071 | A   |   | 3/1998  | Saito et al.    |           |
|-----------|-----|---|---------|-----------------|-----------|
| 6,118,783 | A   | * | 9/2000  | Kunito          | 370/399   |
| 6,188,689 | B1  | * | 2/2001  | Katsube et al.  | 370/389   |
| 6,414,939 | B1  |   | 7/2002  | Yamato          |           |
| 6,480,492 | B1  | * | 11/2002 | Lundback et al. | 370/395.1 |
| 6,577,632 | B2  | * | 6/2003  | Hara et al.     | 370/395.1 |
| 6,611,525 | B1  | * | 8/2003  | Natanson et al. | 370/395.53|
| 6,707,814 | B1  | * | 3/2004  | Ohgane          | 370/389   |
| 6,732,206 | B1  | * | 5/2004  | Jensen et al.   | 710/105   |
| 6,741,599 | B1  | * | 5/2004  | Dunn et al.     | 370/395.6 |
| 7,116,674 | B2  | * | 10/2006 | Shi             | 370/419   |

(Continued)

FOREIGN PATENT DOCUMENTS

JP         7202908         8/1995

(Continued)

OTHER PUBLICATIONS

Notification of Reasons for Rejection dated Dec. 11, 2007 from the corresponding Japanese Patent Application 2005-022622.

(Continued)

*Primary Examiner*—Phirin Sam
(74) *Attorney, Agent, or Firm*—Katten Muchin Rosenman LLP

(57) ABSTRACT

A converter for connecting its ATM network with other ATM networks through a LAN, which is provided with an address translation table storing external VPIs, internal VPIs uniquely assigned to the LAN, and opposing MAC addresses for opposing converters in correspondence and a processing unit for performing control for transmitting, to the LAN, frames changed from the external VPI/VCIs of headers of cells from its ATM network to the internal VPI/VCIs by referring to the address translation table and having opposing MAC addresses corresponding to the internal VPI/VCIs attached, removing the opposing MAC addresses of frames received from the LAN by referring to the address translation table, and transmitting cells changed from internal VPI/VCIs to external VPI/VCIs to its ATM network.

3 Claims, 14 Drawing Sheets

U.S. PATENT DOCUMENTS

| | | |
|---|---|---|
| 7,391,778 B2* | 6/2008 | Oh .......................... 370/395.3 |
| 2003/0152075 A1* | 8/2003 | Hawthorne et al. ......... 370/389 |
| 2004/0037288 A1* | 2/2004 | Bourgart et al. .......... 370/395.1 |
| 2004/0131064 A1* | 7/2004 | Burwell et al. ............. 370/397 |
| 2004/0160958 A1* | 8/2004 | Oh .......................... 370/395.1 |

FOREIGN PATENT DOCUMENTS

| | | |
|---|---|---|
| JP | 11-088345 | 3/1999 |
| JP | 2001045058 | 2/2001 |
| JP | 2002-319953 | 10/2002 |
| JP | 2002-319955 | 10/2002 |

OTHER PUBLICATIONS

Notification of Reasons for Rejection with translation dated May 27, 2008 from the corresponding Japanese Patent Application 2008-025877.

Notification of Reasons for Rejection with translation dated May 27, 2008 from the corresponding Japanese Patent Application 2007-162055.

Decision of Final Rejection dated Sep. 3, 2008, from the corresponding Japanese Application.

Notification of Reasons for Rejection dated Dec. 11, 2007 from the corresponding Japanese Patent Application 2005-022622.

* cited by examiner

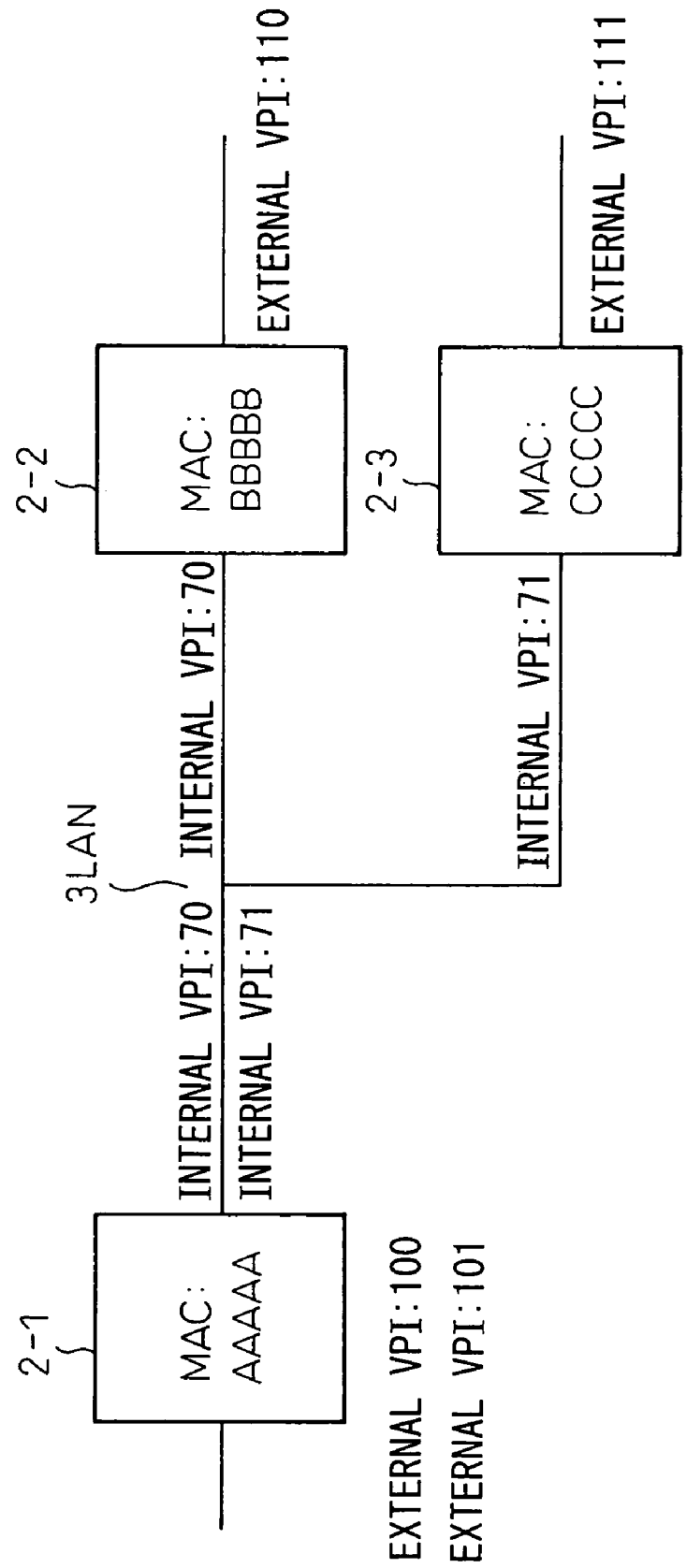

FIG.4A

| DESTINATION MAC ADDRESS (BROADCAST) | ORIGINATION MAC ADDRESS | TYPE (VPI-MAC RESOLUTION TYPE) | REQUEST TYPE (REQUEST) | INTERNAL VPI |

FIG.4B

| DESTINATION MAC ADDRESS | ORIGINATION MAC ADDRESS | TYPE (VPI-MAC RESOLUTION TYPE) | REQUEST TYPE (REPLY) | INTERNAL VPI |

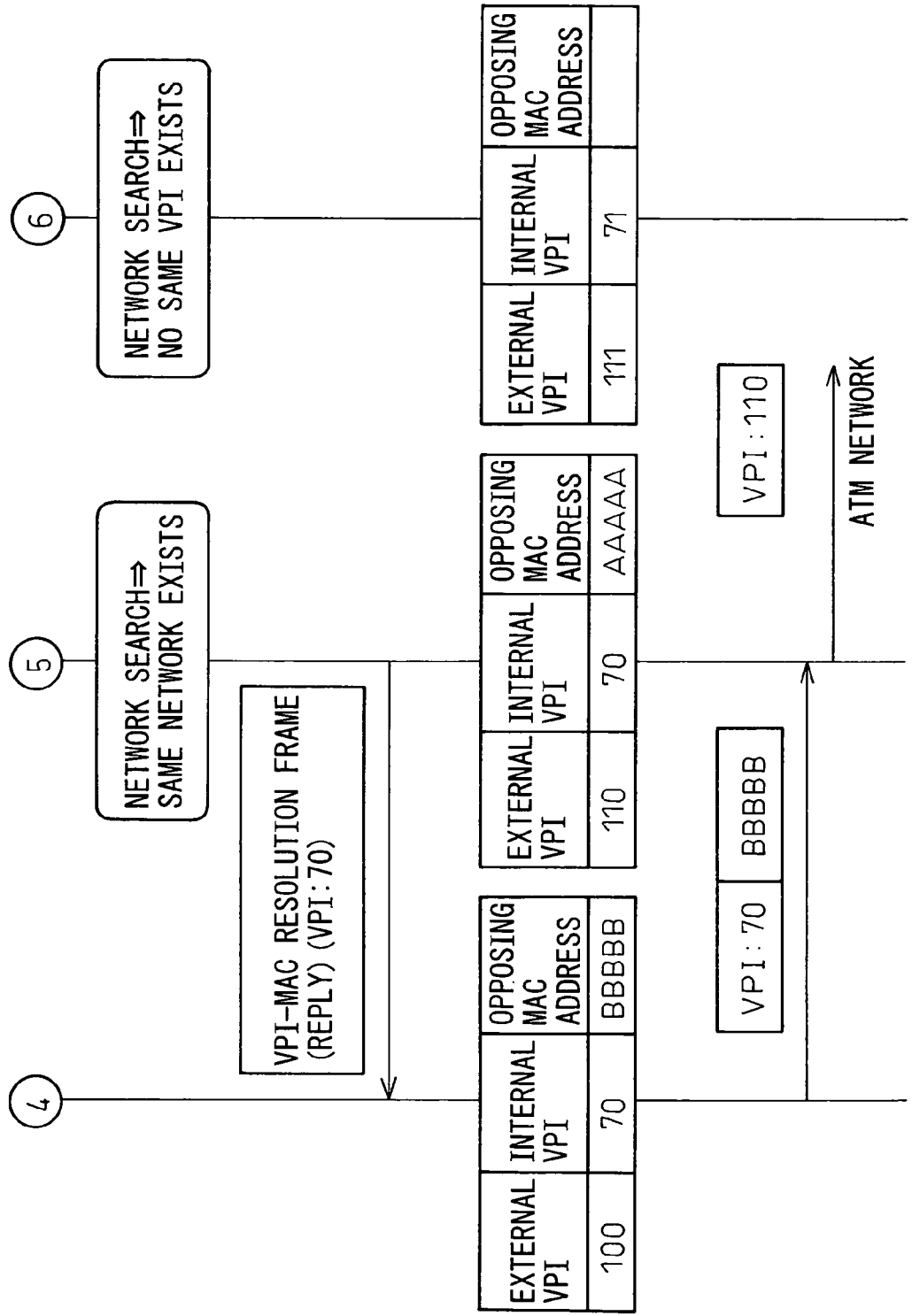

PUBLIC TOPOLOGY=ADDRESS SUPPLIED FROM PROVIDER ETC
SITE TOPOLOGY=FIELD ABLE TO BE FREELY DETERMINED IN ORGANIZATION
INTERFACE ID=HOST PART

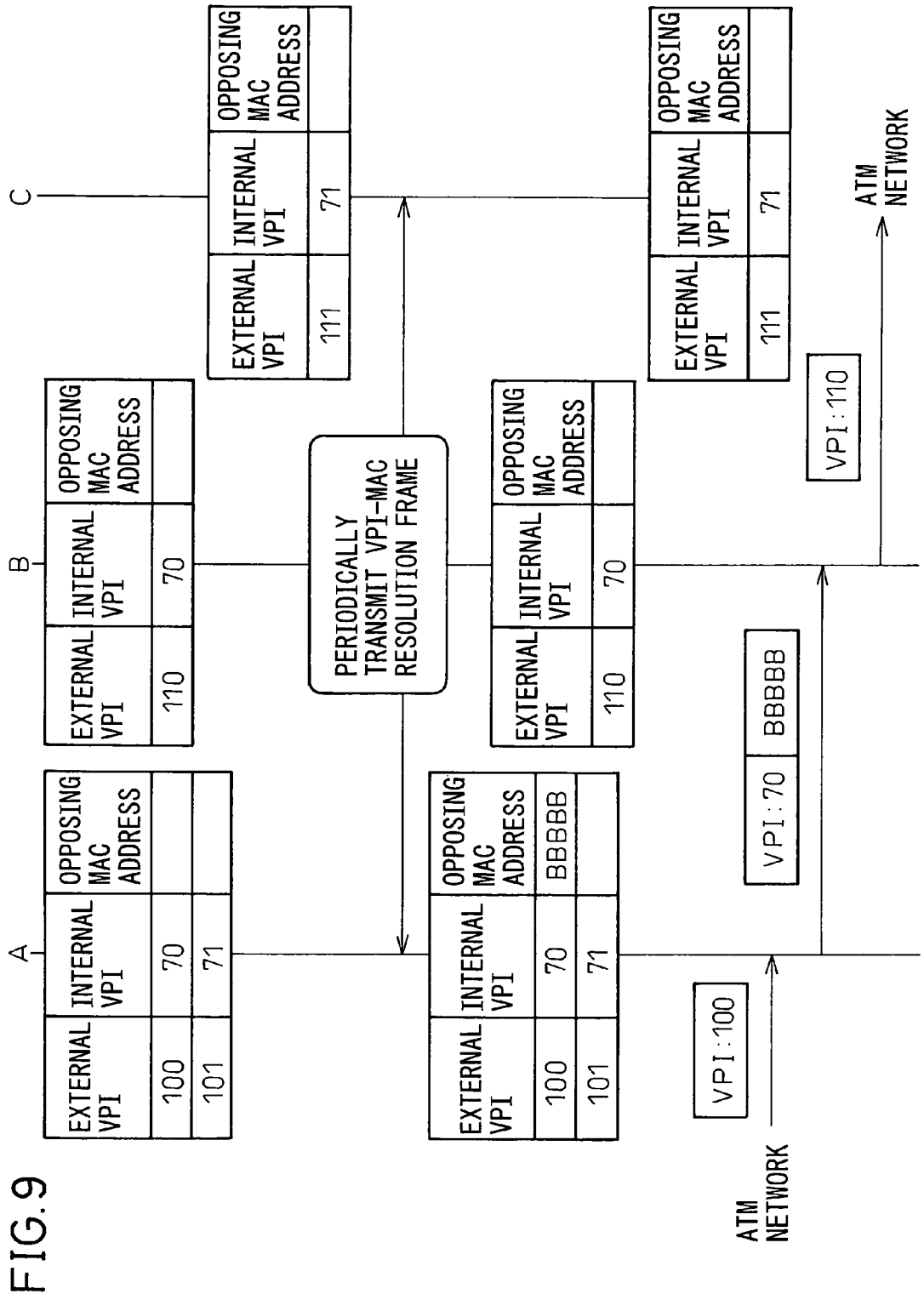

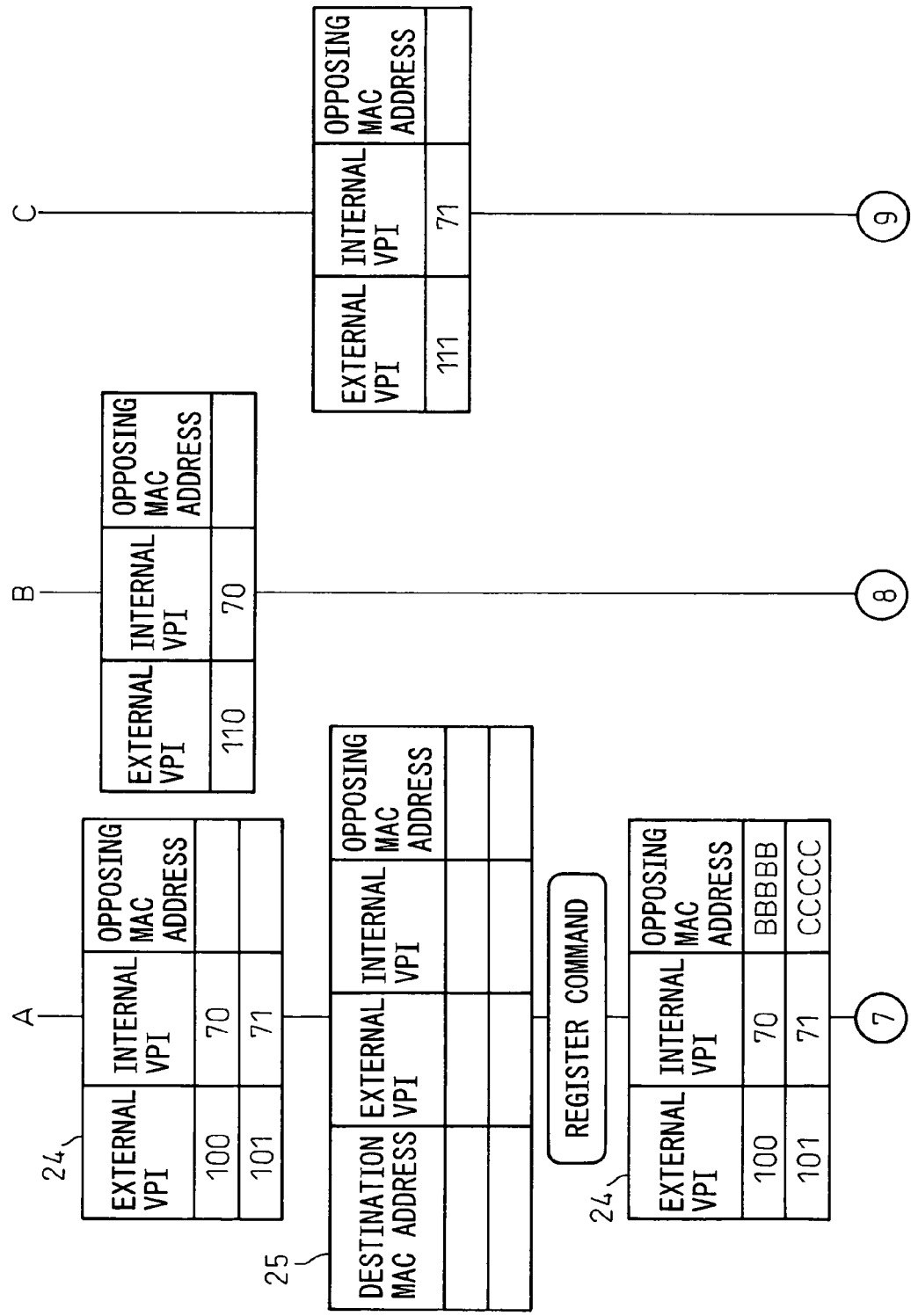

FIG.11B

| DESTINATION MAC ADDRESS | EXTERNAL VPI | INTERNAL VPI | OPPOSING MAC ADDRESS |
|---|---|---|---|
| BBBBB | 110 | 70 | AAAAA |
| CCCCC | 111 | 71 | AAAAA |

25

REGISTER COMMAND

⑦

| EXTERNAL VPI | INTERNAL VPI | OPPOSING MAC ADDRESS |
|---|---|---|
| 110 | 70 | AAAAA |

⑧

| EXTERNAL VPI | INTERNAL VPI | OPPOSING MAC ADDRESS |
|---|---|---|
| 111 | 71 | AAAAA |

⑨

VPI:100 ATM NETWORK

VPI:70 BBBBB

VPI:110 ATM NETWORK

CONVERTER AND COMMUNICATION CONTROL METHOD

BACKGROUND OF THE INVENTION

1. Field of the Invention

The present invention relates to a converter having an address translation function and a communication control system in a network system including such a converter.

2. Description of the Related Art

In the past, as a network system for transmitting various types of data, for example, an asynchronous transfer mode (ATM) network, Ethernet® network (hereinafter explained as a "local area network (LAN)" or "wide area LAN"), etc. are known. An ATM network breaks down data into 48-byte cells, adds 5-byte headers to these, and transmits the resultant 53-byte cells. It transmits the data to the opposing side at a high speed in accordance with virtual path identifiers (VPI) and virtual channel identifiers (VCI) at headers of the cells. Further, a LAN adds the source address and destination address to the headers to compose frames for transmission. For example, there are known the 100BASE-FX, 100BASE-T, 1000BASE-LX, 1000BASE-SX, 10GBASE-X, and other specifications of the IEEE802.3 standard.

Further, in a LAN, each terminal is assigned a media access control (MAC) address. This MAC address is used as a destination address when composing and transmitting a frame of data. Further, in a wide area LAN, terminals positioned at geographically separated sites are connected through bridges etc. arranged at those sites and provided with required transmission capabilities. Note that for efficiently forwarding communication data constituted by Internet protocol (IP) packets with nonspecific MAC addresses, one method is to provide an address table in each bridge to provide a function of translating between IP addresses and MAC addresses. When constructing such an address table, as an address resolving means spanning transmission layers, for example, there is known the means of utilizing an address resolution protocol (ARP) to acquire the MAC address of a destination (for example, see Japanese Unexamined Patent Publication (Kokai) No. 2002-319953).

Summarizing the problems to be solved by the invention, the above-mentioned ATM network transmits cells of data in accordance with the VPI/VCIs attached to the headers. It has various advantages, but the cost of maintenance of lines connecting a plurality of ATM exchanges or a plurality of sites is high, so there is the problem of increased costs. As opposed to this, the above-mentioned LAN can maintain multipoint-to-multipoint lines at a relatively low cost and does not include any expensive exchanges, so there is the advantage that the costs can be reduced. Therefore, it has been proposed to form part of each ATM network by a LAN (in particular a wide area LAN) and connect a plurality of such ATM exchanges through the LAN to construct a network system. In this case, means of translating between the VPI/VCIs attached to the headers of the cells in the ATM networks and the MAC addresses attached to the frames in the LAN, that is, address resolving means, become necessary.

Therefore, it may be considered to provide a MAC address management server. However, a MAC address management server would be relatively expensive and would have to be provided for each ATM exchange, so there would be the problem that even use of a LAN would not enable the costs to be sufficiently reduced. Note that for the MAC address translation of a bridge in the prior art, only a means for translating between an IP address and MAC address is shown. An ATM network has not been considered at all.

SUMMARY OF THE INVENTION

An object of the present invention is to provide means for reducing cost and resolving addresses by connecting an ATM network and a LAN through a converter of a relatively simple configuration and relatively low cost.

To attain the above object, there is provided a converter connecting its ATM network with a plurality of other ATM networks through a LAN and provided with an address translation table storing external VPIs, internal VPIs uniquely assigned to the LAN, and opposing MAC addresses for opposing converters in correspondence and a processing unit for performing control for transmitting, to the LAN, frames changed from the external VPI/VCIs of headers of cells from its ATM network to the internal VPI/VCIs by referring to the address translation table and having opposing MAC addresses corresponding to the internal VPI/VCIs attached, removing the opposing MAC addresses of frames received from the LAN by referring to the address translation table, and transmitting cells changed from internal VPI/VCIs to external VPI/VCIs to its ATM network.

BRIEF DESCRIPTION OF THE DRAWINGS

These and other objects and features of the present invention will become clearer from the following description of the preferred embodiments given with reference to the attached drawings, wherein:

FIG. 3 is a view explaining a VPI and MAC address;

FIGS. 4A and 4B are views explaining a VPI-MAC resolution frame;

FIGS. 7A and 7B are flow charts of a second embodiment of the present invention;

FIG. 9 is a flow chart of a third embodiment of the present invention;

FIGS. 11A and 11B are flow charts of a fourth embodiment of the present invention.

DESCRIPTION OF THE PREFERRED EMBODIMENTS

Figure 1:
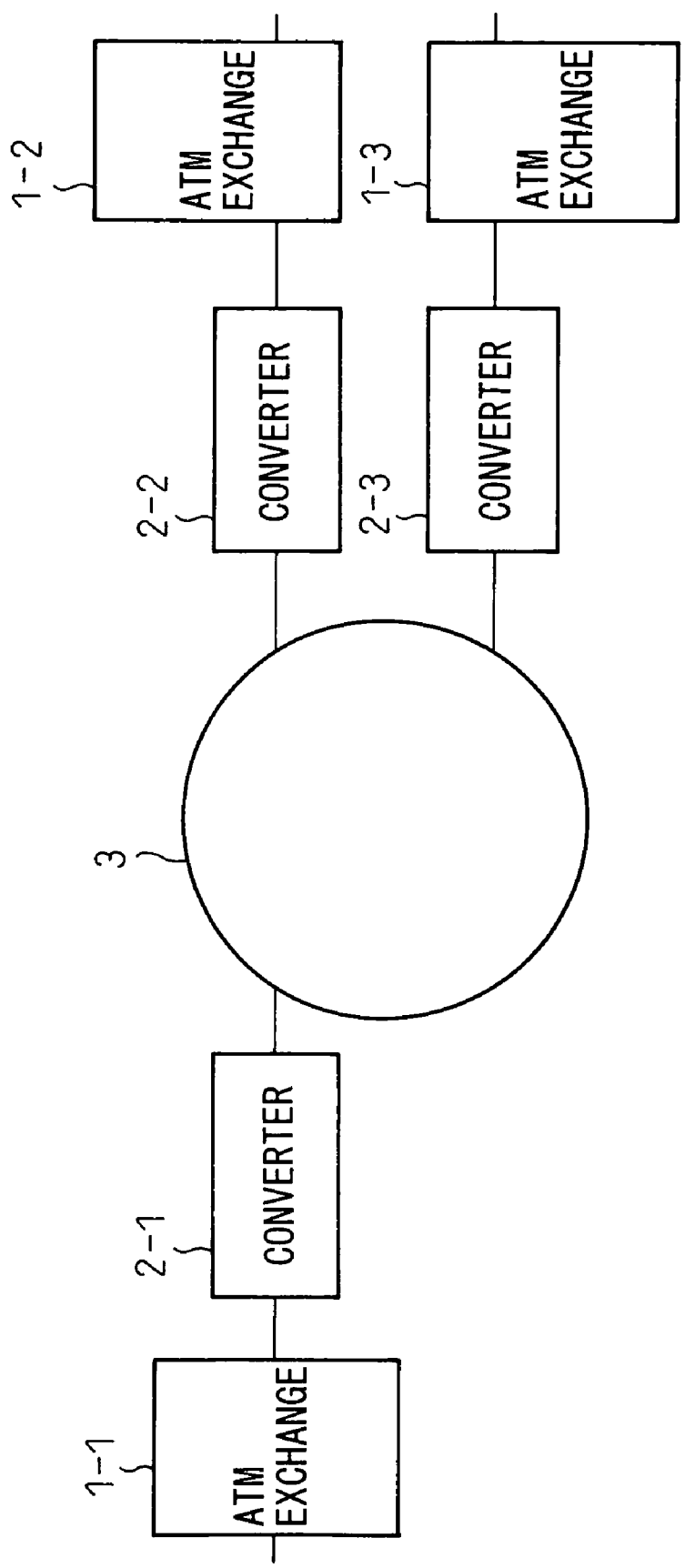
FIG. 1 is a view explaining a network system of a first embodiment of the present invention.

Preferred embodiments of the present invention will be described in detail later while referring to the attached drawings. Before this, the present invention will be summarized as below.

The converter of the present invention is a converter connecting its ATM network with a plurality of other ATM networks by a LAN and provided with an address translation table storing external VPI/VCIs showing destinations of cells transmitted by the ATM networks, internal VPI/VCIs assigned uniquely to the LAN, and opposing MAC addresses for opposing converters connected to the LAN in correspondence and a control processing unit for performing control for transmitting, to the LAN, frames changed from the external VPI/VCIs of headers of cells from its ATM network to the internal VPI/VCIs by referring to the address translation table and having opposing MAC addresses corresponding to the internal VPI/VCIs attached, removing the opposing MAC addresses of frames received from the LAN by referring to the address translation table, and transmitting cells changed from internal VPI/VCIs to external VPI/VCIs to its ATM network.

The communication control method of the present invention is achieved in a network system comprised of a plurality of ATM networks connected by converters to a LAN, comprising a step of having each converter be provided with an address translation table and a control processing unit, broadcast, to the LAN, a special frame including an internal VPI/VCI corresponding to an external VPI/VCI indicating the destination of a cell transmitted from the ATM network and uniquely assigned to the LAN and its own MAC address, a step of having a converter recognizing the internal VPI/VCI of the special frame and receiving the frame transmit, to the LAN, a reply frame having a source MAC address of the special frame as a destination MAC address and having its own MAC address as a source MAC address, and a step of having the converter receiving the reply frame register and set in an address translation table the external VPI/VCI, the internal VPI/VCI, and the source MAC address of the reply frame as the opposing MAC address in correspondence.

Preferably, the method further comprises a step of transmitting a special frame including the internal VPI/VCI in an IPv6 address to the LAN and a step of receiving a reply frame from a converter corresponding to the internal VPI/VCI to construct the address translation table.

Preferably, the method further comprises a step of having a converter periodically transmit the special frame to the LAN, receive a reply frame of the special frame, and set and register it in the address translation table.

Alternatively, the communication control method is a communication control method in a network system comprised of a plurality of ATM networks connected by converters to a LAN, comprising a step of having each converter be provided with an address translation table, an opposing VPI-MAC table, and a control processing unit, set and register in the address translation table an internal VPI/VCI corresponding to an external VPI/VCI indicating the destination of a cell transmitted from the ATM network and uniquely assigned to the LAN and an opposing MAC address, set and register in the opposing VPI-MAC table an external VPI/VCI, an internal VPI/VCI, a destination MAC address for an opposing converter through the LAN, and an opposing MAC address indicating its own MAC address, and transmit to the LAN a special frame including the internal VPI/VCI, the destination MAC address, and an opposing MAC address indicating its own MAC address based on content set and registered in the opposing VPI-MAC table and a step of having a converter receiving the special frame in accordance with the destination MAC address set and register in the address translation table of the converter the opposing MAC address of the special frame in correspondence to the external VPI/VCI and internal VPI/VCI.

Summarizing the effects of the invention, there is provided a converter connecting an ATM network including an ATM exchange with a plurality of other converters through a LAN and having a relative simple configuration and including an address translation table. Therefore, it is possible to reduce the costs of a network system. The address resolution for transmitting cells across ATM networks as frames through the LAN can be performed by the address translation tables of the converters. The address translation tables for this address resolution can be built efficiently and autonomously by the transfer of VPI-MAC resolution frames or other special frames.

Figure 2:
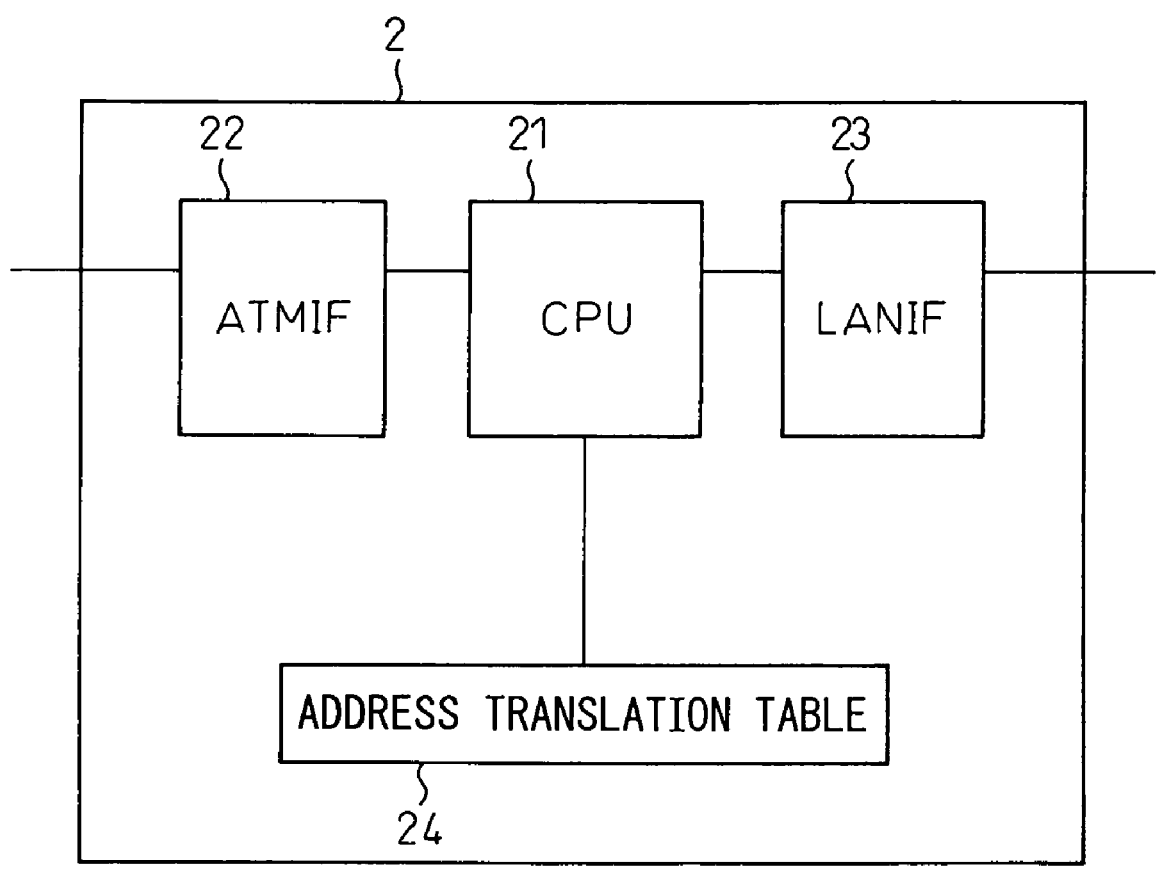
FIG. 2 is a view explaining principal parts of a converter of a first embodiment of the present invention.

Turning now to the best mode for working the invention, referring to FIG. 1 and FIG. 2, the converter of the present invention is a converter (any one of 2-1 to 2-3) connecting an ATM network with a plurality of other ATM networks through a LAN 3 and provided with an address translation table 24 storing external VPI/VCIs showing the destinations of cells for transmission from the ATM network, internal VPI/VCIs uniquely assigned to the LAN 3, and opposing MAC addresses for opposing converters (others of 2-1 to 2-3) connected to the LAN 3 in correspondence and a processing unit 21 for performing control for transmitting, to the LAN 3, frames changed from the external VPI/VCIs of headers of cells from ATM network to internal VPI/VCIs by referring to the address translation table 24 and having opposing MAC addresses corresponding to the internal VPI/VCIs attached, removing the opposing MAC addresses of frames received from the LAN 3 by referring to the address translation table 24, and transmitting cells changed from internal VPI/VCIs to external VPI/VCIs to its ATM network.

Further, the communication control method of the present invention is achieved in a network system comprised of a plurality of ATM networks connected by converters 2-1 to 2-3 to a LAN 3, comprising a step of having each of the converters 2-1 to 2-3 be provided with an address translation table 24 and control processing unit 21, broadcast, to the LAN 3, a VPI-MAC resolution frame or other special frame including an internal VPI/VCI corresponding to an external VPI/VCI indicating the destination of a cell transmitted from its ATM network and uniquely assigned to the LAN and its own MAC address, a step of having a converter recognizing the internal VPI/VCI of the special frame and receiving the frame transmit, to the LAN 3, a reply frame having a source MAC address of the special frame as a destination MAC address and having its own MAC address as a source MAC address, and a step of having a converter receiving the reply frame register and set in an address translation table 24 the external VPI/VCI, the internal VPI/VCI, and the source MAC address of the reply frame as the opposing MAC address in correspondence.

EXAMPLE 1

FIG. 1 shows a network system of the present invention. In the figure, 1-1 to 1-3 show ATM exchanges or ATM networks including ATM exchanges, 2-1 to 2-3 show converters, and 3 shows a LAN serving as the above-mentioned Ethernet® network. That is, the network is configured by a plurality of ATM networks including the ATM exchanges 1-1 to 1-3 connected through the converters 2-1 to 2-3 and the LAN 3. Note that the ATM exchanges can be provided in a greater number and be connected through the converters by the LAN 3 as well. Alternatively, all or part of the LAN 3 can be comprised by a wide area LAN.

FIG. 2 shows principal parts of a converter 2 corresponding to the converters 2-1 to 2-3 in FIG. 1. Reference numeral 21 shows a control processing unit (CPU), 22 an ATM interface (ATMIF) for connecting with the ATM networks 1-1 to 1-3, 23 a LAN interface (LANIF) for connecting with the LAN 3, and 24 an address translation table.

The control processing unit 21 is comprised of a processor which has the functions of processing for control of transfer of a cell by the ATM interface 22, processing for control of writing and reading to and from the address translation table 24, processing for changing the VPI/VCI of a header showing the destination of a cell (hereinafter referred to as a "VPI"), processing for adding a MAC address to a frame for transmission and deleting a MAC address from a received frame, and processing for control of transfer of a frame by the LAN interface 23. Further, the address translation table 24 is set with external VPIs of the ATM network side, internal VPIs of the LAN side (made unique values in the LAN), and MAC addresses in correspondence. After finishing setting, the control processing unit 21 refers to the address translation table 24 to determine the correspondence between a VPI and MAC address and transfer data between ATM networks through the LAN.

The ATM exchanges 1-1 to 1-3, converters 2-1, 2-2, and 2-3, and LAN 3 shown in FIG. 1, are explained, as shown in FIG. 3, with the MAC addresses of the converters 2-1, 2-2, and 2-3 designated as AAAAA, BBBBB, and CCCCC, the external VPIs in the converter 2-1 as 100 and 101 and the internal VPIs as 70 and 71, and the external VPI in the converter 2-3 as 111 and the internal VPI as 71. Below, the settings of the address translation table will be explained.

In Example 1, when constructing an address translation table 24, the address translation table 24 is set with the external VPIs and internal VPIs, then the converter transmits and receives VPI-MAC resolution frames as special frames so as to set and register the MAC addresses. FIGS. 4A and 4B are views explaining such a VPI-MAC resolution frame. FIG. 4A shows an example of a VPI-MAC resolution frame (Request) as such a special frame, while FIG. 4B shows an example of a VPI-MAC resolution frame (Reply) as a reply frame to this special frame. Such a frame includes fields for the destination MAC address, source MAC address, frame type, request type, and internal VPI.

The VPI-MAC resolution frame serving as a special frame for obtaining the MAC address of an opposing converter through the LAN, as shown in FIG. 4A, includes the destination MAC address as the address for broadcast, its own MAC address as the source MAC address, the VPI-MAC resolution type as the type of frame, a request showing the address resolution request as the type of request, and an internal VPI uniquely set in the LAN as the internal VPI.

The reply frame for this VPI-MAC resolution frame, as shown in FIG. 4B, includes the source MAC address of the previously received VPI-MAC resolution frame as the source MAC address, its own MAC address as the source MAC address, the VPI-MAC resolution type as the type of frame, a reply as the type of request, and the internal VPI of the previously received VPI-MAC resolution frame as the internal VPI.

Figure 5A:
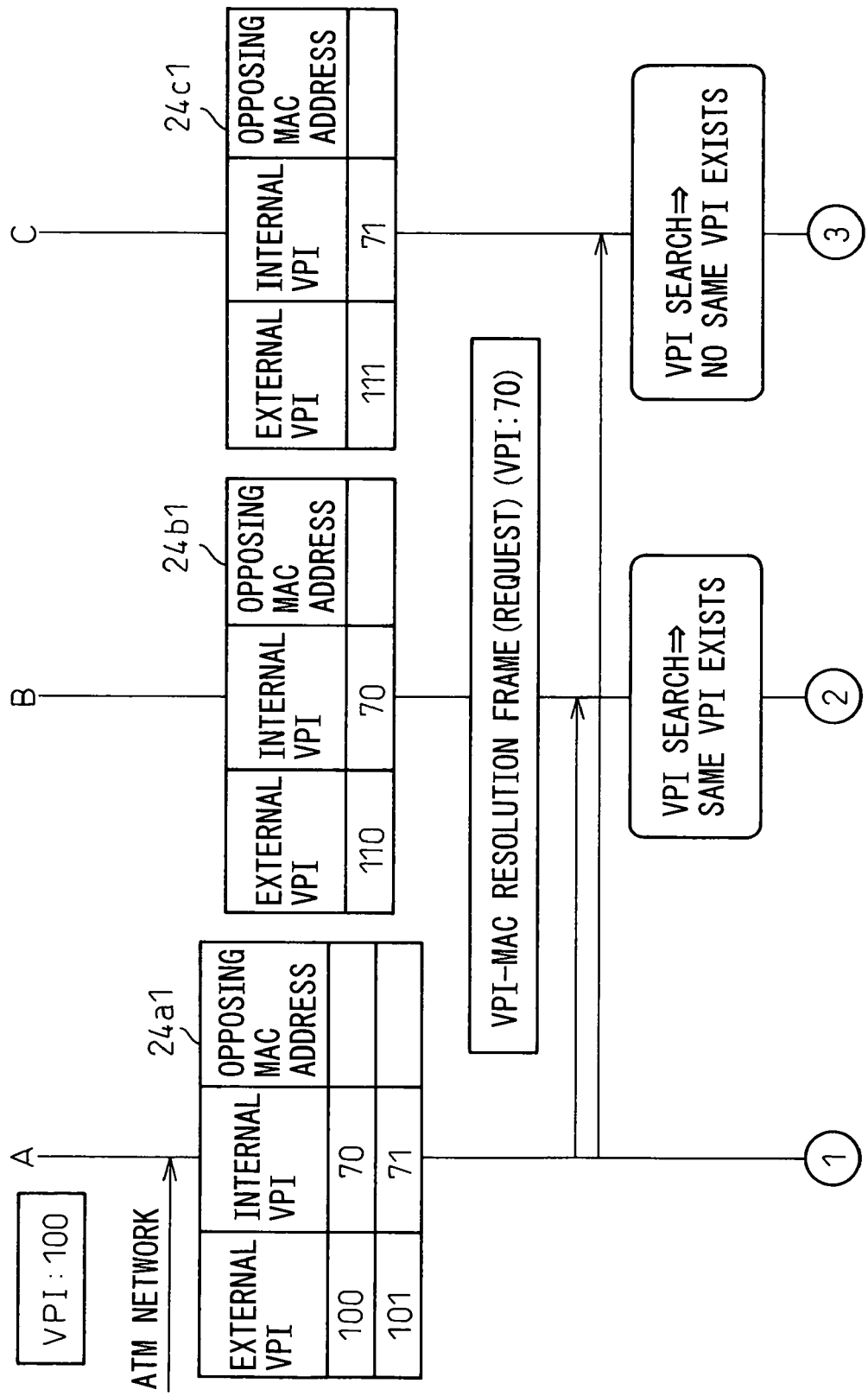
FIGS. 5A and 5B are flow charts of a first embodiment of the present invention.
Figure 5B:
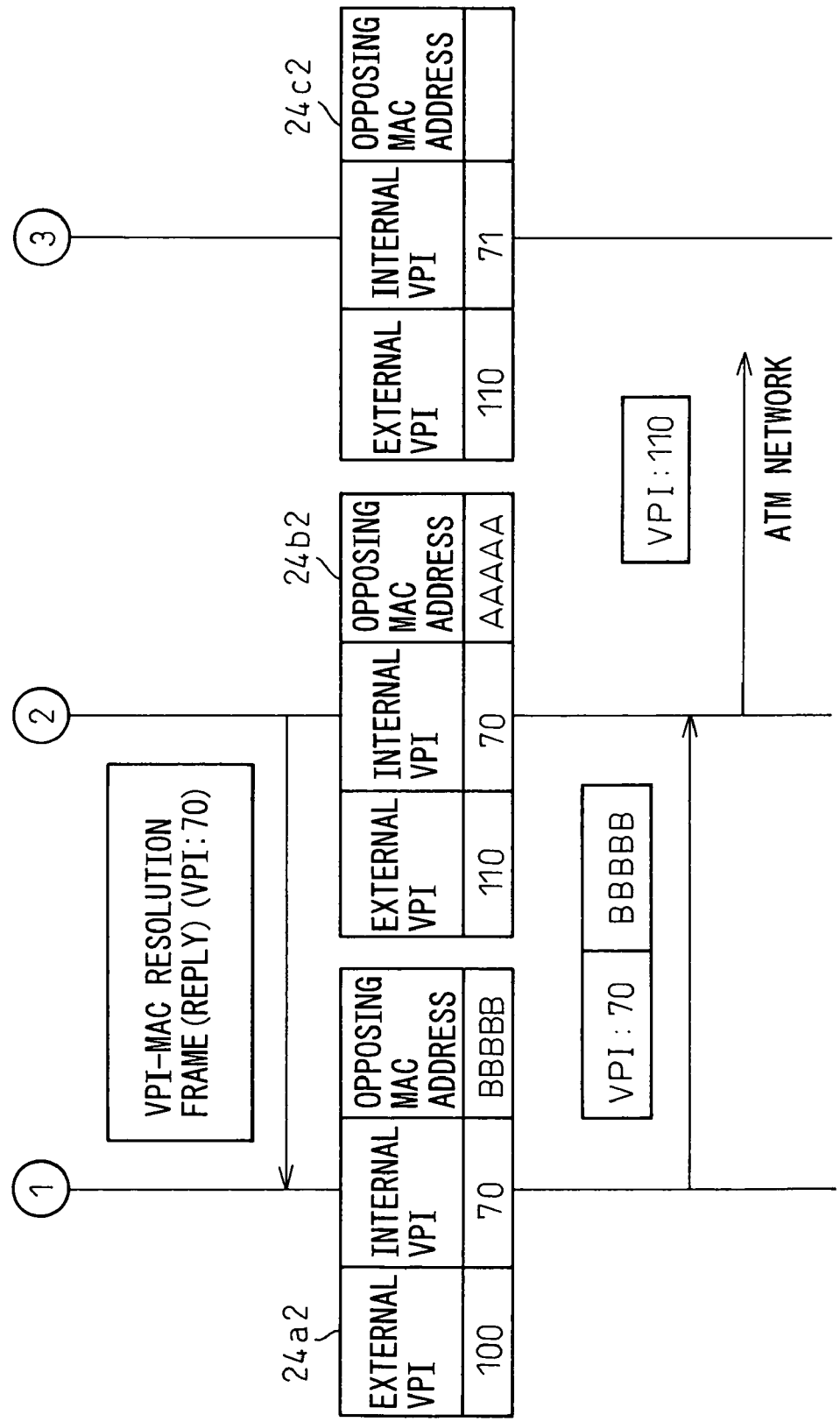
Figure 6A:
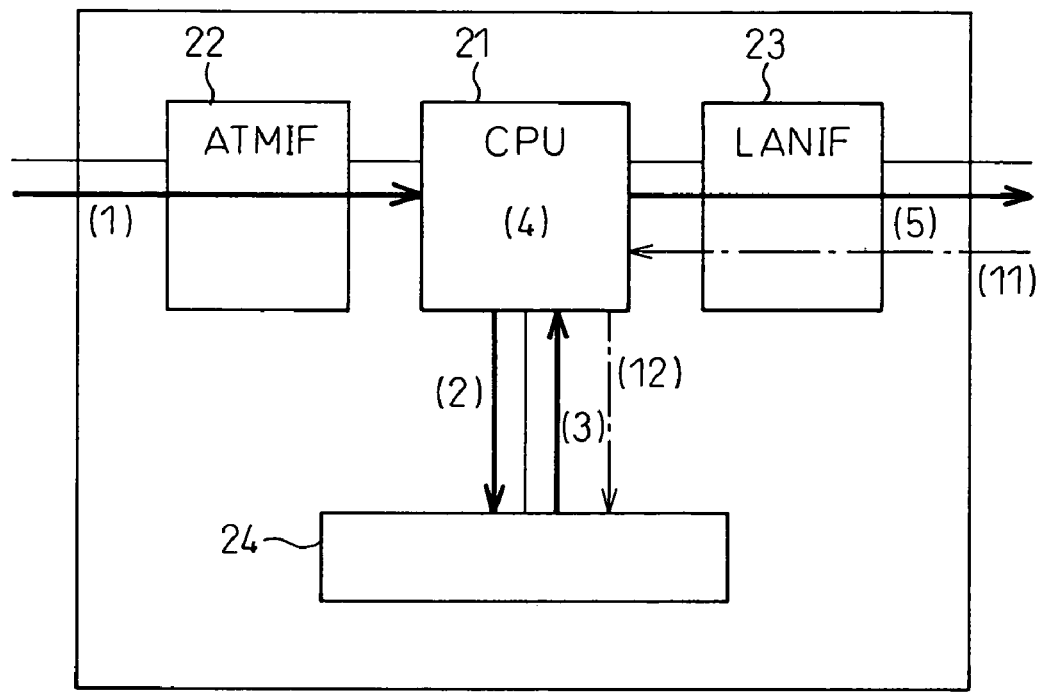
FIGS. 6A and 6B are views explaining the processing of the converter.
Figure 6B:
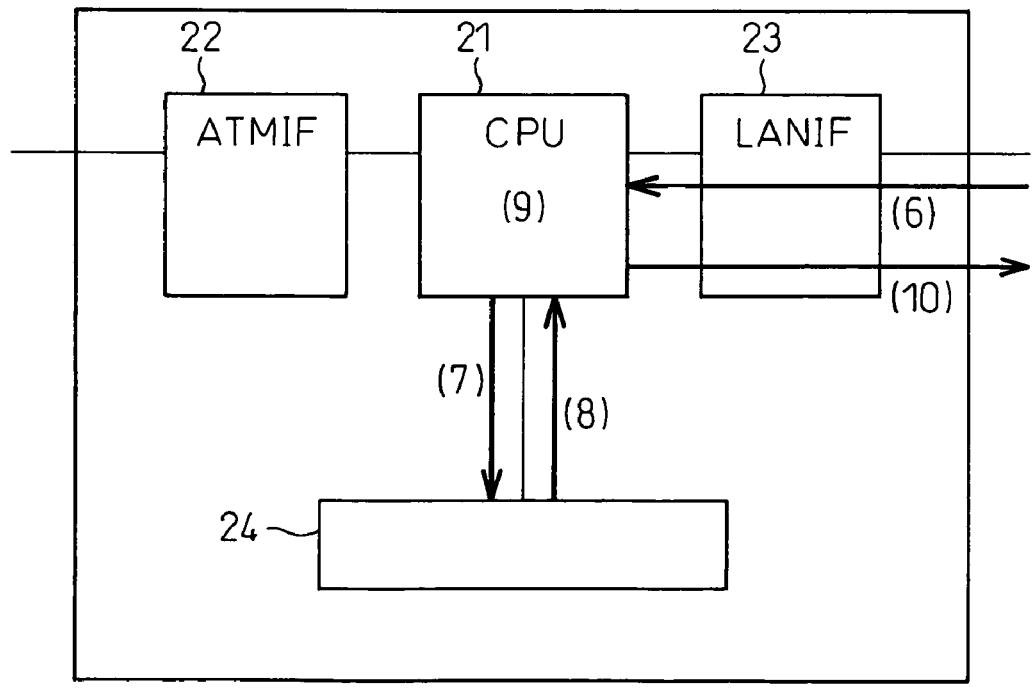

FIGS. 5A and 5B show flow charts of Example 1 of the present invention, while FIGS. 6A and 6B show the processing steps (1) to (12) of a converter 2 for the MAC address resolution processing in accordance with the flow charts of FIGS. 5A and 5B. These will be explained with reference to the configurations shown in FIG. 1 to FIGS. 4A and 4B. In FIGS. 5A and 5B, the converters 2-1 to 2-3 are designated as A, B, and C and the address translation tables 24 are set with external VPIs and internal VPIs as shown as 24a1, 24b1, and 24c1. The explanation will be made of the processing steps in the case of the ATM interface 22 of the converter A receiving a cell from the ATM exchange 1-1 (ATM network) of the external VPI: 100 in the state with an opposing MAC address set for the converter through the LAN.

When the converter A receives a cell from its ATM network from the ATM interface 22 (1) (see FIG. 6A), the control processing unit 21 of the converter A searches through the address translation table 24a1 (see FIG. 5A) using as a key the external VPI: 100 added to the header of the received cell (2).

Since the opposing MAC address is not set in the address translation table 24a1, the control processing unit 21 of the converter A fetches the internal VPI: 70 corresponding to the external VPI: 100 (3), changes the external VPI: 100 of the header of the received cell to the internal VPI: 70 to generate a VPI-MAC resolution frame (Request) (4), and transmits it from the LAN interface (LANIF) 23 to the LAN (5). This VPI-MAC resolution frame (Request), as shown in FIG. 4A, has the destination MAC address made to show a broadcast and has the source MAC address made its own MAC address: AAAAA. This MAC address: AAAAA is confirmed as its own MAC address in the control processing unit 21.

When the converters B and C receive the VPI-MAC resolution frame (Request) through the LAN interface 23 (6) (see FIG. 6B), their control processing units 21 search whether the internal VPI: 70 added to the received VPI-MAC resolution frame (Request) has been set in the address translation tables 24b1 and 24c1 (7). In the converter B, the internal VPI: 70 has been set in the address translation table 24b1 (see FIG. 5A), so the control processing unit 21 of the converter B fetches this internal VPI: 70 from the address translation table 24b1 (8), generates a VPI-MAC resolution frame (Reply) having the source MAC address: AAAAA of the received VPI-MAC resolution frame as the destination MAC address and the source MAC address as its own MAC address: BBBBB (9) and transmits it from the LAN interface 23. At this time, the MAC address: AAAAA is set corresponding to the internal VPI: 70 in the address translation table 24b1 of the converter B to obtain the content shown in 24b2.

Since the address translation table 24c1 is not set with the internal VPI: 70, the converter C does not reply to the VPI-MAC resolution frame (Reply) even if receiving it since it has no identical VPI. Therefore, the address translation table of the converter C shows 24c2 the same as 24c1 (see FIGS. 5A and 5B). Further, if receiving the VPI-MAC resolution frame (Reply) from the converter B as shown by the one-dot chain line arrow of FIG. 6A from the LAN interface 23 of the converter A (11), the control processing unit 21 sets the received MAC address: BBBBB in the region corresponding to the internal VPI: 70 at the address translation table 24a1 (12).

Due to this, as shown in FIGS. 5A and 5B, the address translation table 24 of the converter A, as shown as 24a2, is set with the MAC address: BBBBB of the converter B corresponding to the external VPI: 100 and internal VPI: 70, while the address translation table 24 of the converter B, as shown by 24b2, is set with the MAC address: AAAAA of the converter A corresponding to the external VPI: 110 and internal VPI: 70.

In this state, in the converter A, the control processing unit 21 searches through the address translation table 24 (24a2) for the cell of the external VPI: 100 from the ATM network using as a key the external VPI: 100 and as explained above reads out the internal VPI: 70 and MAC address: BBBBB, changes the external VPI: 100 of the cell header to the internal VPI: 70, generates a frame comprised of this cell plus the destination MAC address: BBBBB and source MAC address: AAAAA, and transmits this frame to the LAN.

In the converter B, the unit receives the frame of the destination MAC address: BBBBB addressed to itself, deletes the destination MAC address: BBBBB and source MAC address: AAAAA, refers to the address translation table 24 (24b2), and transmits the cell changed from the internal VPI: 70 to the external VPI: 110 from the ATM interface 22 to its ATM network. Therefore, address resolution becomes possible for transmitting the cell from the ATM network of the external VPI: 100 through the LAN to the ATM network of the external VPI: 110. The converters A and C and the converters B and C may also perform similar processing to the above between them so as to build address translation tables 24. By this, it is possible to transfer data among a plurality of ATM networks through the LAN.

As explained above, the converters A, B, and C can be realized by relatively simple configurations including address translation tables 24 for translating between VPIs and MAC addresses. Each address translation table 24 can be realized, as explained above, by determining the correspondence of the VPIs and MAC addresses for all ATM networks by transmitting and receiving VPI-MAC resolution frames or other special frames. Therefore, it is possible to transfer data among ATM networks connected by a LAN without providing a MAC address management server.

EXAMPLE 2

Figure 7A:
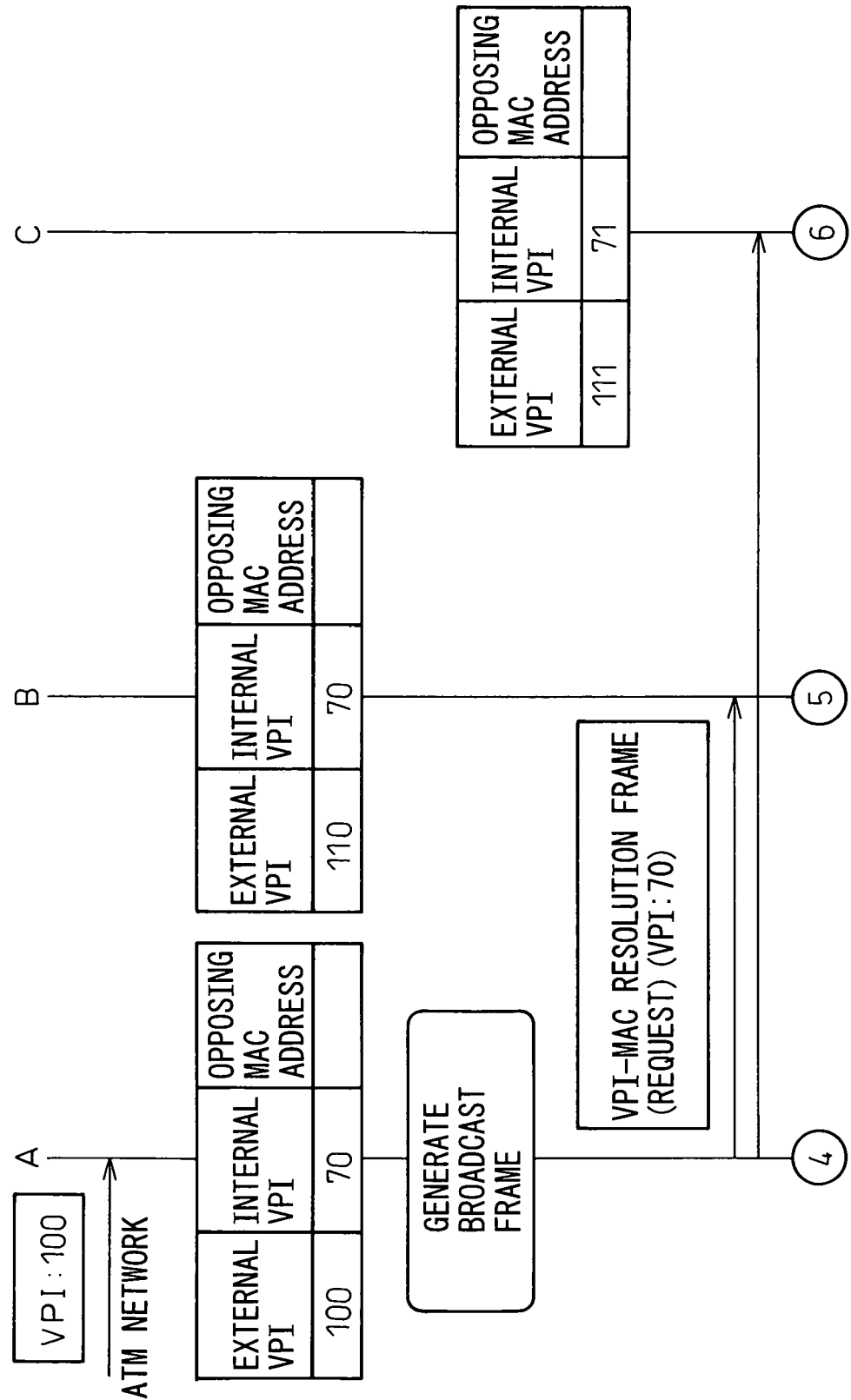
Figure 8A:
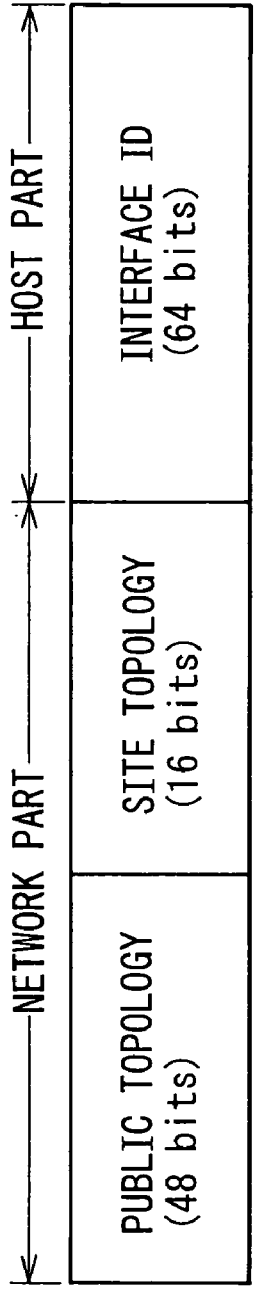
FIGS. 8A and 8B are views explaining an Internet Protocol Version 6 (IPv6) address.
Figure 8B:
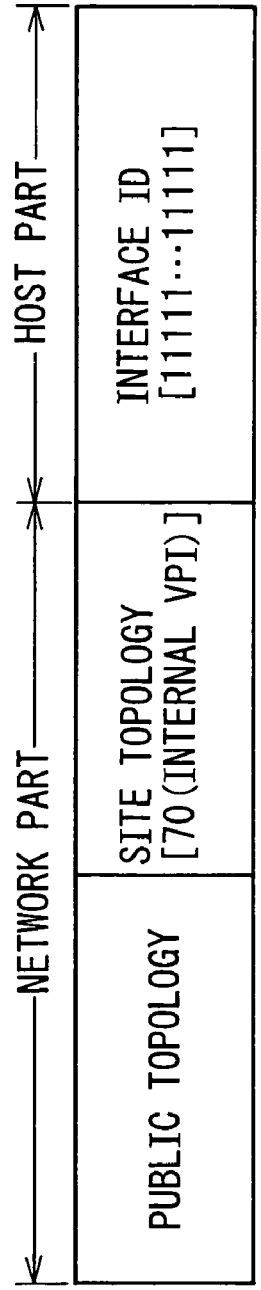

FIGS. 7A and 7B show flow charts of Example 2 of the present invention and shows the case of application of the IPv6 based on the RFC (Request for Comments) 2373. FIGS. 8A and 8B show the address configuration of this IPv6. As shown in FIG. 8A, this is a 128-bit configuration comprised of a 64-bit network part and a 64-bit host part. The network part is comprised of a 48-bit public topology and an 18-bit site topology. FIG. 8B shows the case of setting the internal VPIs in the site topology and making the host part (interface ID) all "1" for broadcasting.

In FIGS. 7A and 7B, the converters 2-1 to 2-3 shown in FIG. 1 are designated as A, B, and C. Each of these converters A, B, and C, as shown in FIG. 2, is configured including a control processing unit 21, ATM interface 22, LAN interface 23, and address translation table 24. The control processing unit 21 in Example 2 has the function of generating addresses based on the IPv6. In the same way as the initial state of the case shown in FIG. 5, the address translation table of the converter A is set with the internal VPI: 70 corresponding to the external VPI: 100 and the internal VPI: 71 corresponding to the external VPI: 101, the address translation table of the converter B is set with the internal VPI: 70 corresponding to the external VPI: 110, and the address translation table of the converter C is set with the internal VPI: 71 corresponding to the external VPI: 111. The case of using the state with no MAC addresses set as the initial state so as to construct an address translation table will be explained.

When a cell reaches the converter A from the ATM network of the external VPI: 100 for transfer of data from the external VPI: 100 to the external VPI: 110, the converter A refers to the address translation table 24, finds the internal VPI: 70 corresponding to the external VPI: 100, and, as shown in FIGS. 8A and 8B, transmits a VPI-MAC resolution frame (Request) set with the internal VPI: 70 in the site topology of the network part and set with all "1" (broadcast) for the interface ID to the LAN.

The converters B and C receiving the VPI-MAC resolution frame (Request) using this IPv6 compare the network part including their own internal VPIs and the network part of the received frame. In this case, since the latter network part is the same as the network part including the internal VPI: 70 set in the address translation table 24 of the converter B, the converter B transmits a VPI-MAC resolution frame (Reply) using IPv6 including its own MAC address: BBBBB to the converter A. The converter C does not reply since the internal VPI is not the same.

When the converter A receives the VPI-MAC resolution frame (Reply) from the converter B, it sets the MAC address: BBBBB in accordance with the internal VPI: 70 of the address translation table 24. The converter B sets the MAC address: AAAAA in accordance with the internal VPI: 70 of the address translation table 24. Due to this, the converter A transmits a frame changed from the VPI: 100 of the header of the cell to the internal VPI: 70 and attached with the MAC address: BBBBB to the LAN. The converter B receives this the MAC address: BBBBB, deletes this, changes the VPI of the head of the cell to the external VPI: 110 with reference to the address translation table 24, then transmits this to its ATM network. The processing steps at the converters A and B become substantially the same as the case shown in FIGS. 6A and 6B.

In this way, according to Example 2, since the destination addresses of the frames transferred between the converters are mapped in the address space of the IPv6 in advance, even when ATM networks and IPv6 networks are both present on a LAN, it is possible to construct a network system using the present invention.

EXAMPLE 3

FIG. 9 shows a flow chart of Example 3 of the present invention. Here, the converters 2-1 to 2-3 shown in FIG. 1 are designated as A, B, and C. Each of the converters A, B, and C, as shown in FIG. 2, is configured including a control processing unit 21, an ATM interface 22, a LAN interface 23, and an address translation table 24. The control processing unit 21 in Example 3 has the function of broadcasting a VPI-MAC resolution frame (Request) for a predetermined period. The function in this case may also be provided at all of the converters. In this case, each converter preferably is given a different transmission cycle or transmission timing. It is also possible to provide this function at just the important converters.

In the same way as the initial state in FIGS. 5A and 5B, the address translation table of the converter A is set with the internal VPI: 70 corresponding to the external VPI: 100 and the internal VPI: 71 corresponding to the external VPI: 101, the address translation table of the converter B is set with the internal VPI: 70 corresponding to the external VPI: 110, and the address translation table of the converter C is set with the internal VPI: 71 corresponding to the external VPI: 111, but from the initial state where no MAC address is set, the converter B periodically transmits the VPI-MAC resolution frame set with its own MAC address: BBBBB and an internal VPI of for example 70.

When the converter A receives the VPI-MAC resolution frame of the broadcast from the converter B, it refers to the address translation table 24 based on the internal VPI: 70 set in the VPI-MAC resolution frame and, since the internal VPI: 70 is set, sets the source MAC address: BBBBB of the VPI-MAC resolution frame corresponding to the internal VPI: 70. In this case, the converter C does not perform any processing since the address translation table 24 is not set with the internal VPI: 70.

Further, when an external VPI: 100 cell arrives, the converter A refers to the address translation table 24, translates the external VPI: 100 to the internal VPI: 70, and transmits a frame with the MAC address: BBBBB added. When the converter B receives the MAC address: BBBBB frame addressed to itself, it refers to the address translation table 24 to change the internal VPI: 70 to the external VPI: 110 and transmits the cell to its ATM network. That is, communication between the ATM networks by the external VPI: 100 and external VPI: 110 becomes possible. In Example 3 as well, in the same way as Example 2, it is possible to use the VPI-MAC resolution frame using the IPv6.

By providing the converter C with the function of periodically broadcasting a VPI-MAC resolution frame, it is possible to collect the MAC address: AAAAA of the opposing converter A corresponding to the internal VPI: 71 by the reply frame and set it in the address translation table 24. Further, by periodically broadcasting the VPI-MAC resolution frame, it is possible to automatically update the content of the address translation frame 24 even if adding or deleting converters or otherwise altering the network system.

EXAMPLE 4

Figure 10:
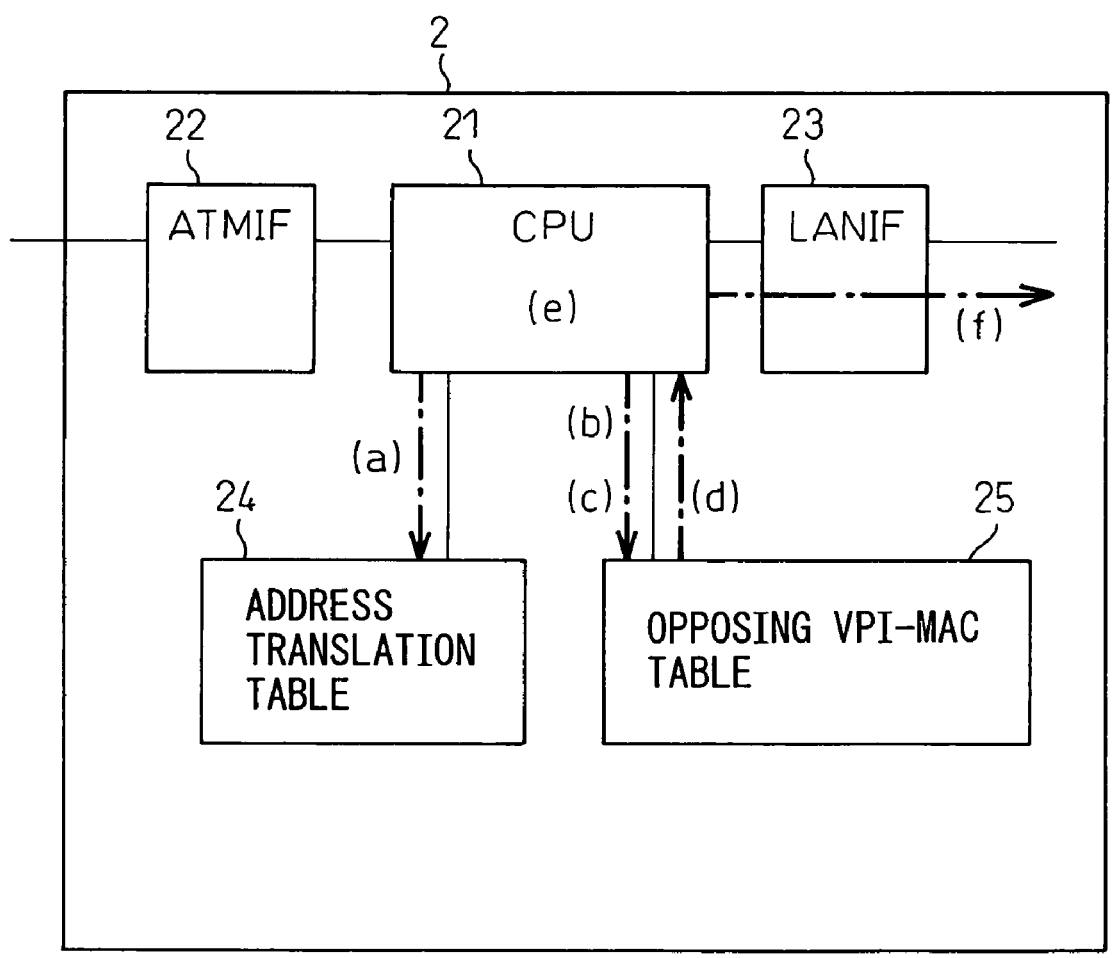
FIG. 10 is a view explaining principal parts of a converter of a fourth embodiment of the present invention.

FIG. 10 is a view explaining principal parts of the converter of Example 4 of the present invention. Notations the same as in FIG. 2 show parts of the same names. Notation 25 indicates an opposing VPI-MAC table. This opposing VPI-MAC table 25 can be set with addresses from the control processing unit 21. The one-dot chain arrows (a) to (f) show processing steps. FIGS. 11A and 11B show the flow chart of Example 4 of the present invention. Here, the converters 2-1 to 2-3 shown in FIG. 1 are designated as A, B, and C. The converter A has the configuration shown in FIG. 10, while the converters B and C have configurations shown in FIG. 2 in this case.

In FIGS. 11A and 11B, in the same way as the case of FIGS. 5A, 5B and FIG. 9, in the initial state, the address translation table 24 of the converter A is set with the internal VPI: 70 corresponding to the external VPI: 100 and the internal VPI: 71 corresponding to the external VPI: 101, the address translation table 24 of the converter B is set with the internal VPI: 70 corresponding to the external VPI: 110, and the address translation table 24 of the converter C is set with the internal VPI: 71 corresponding to the external VPI: 111. This is the state where the opposing MAC address is not set. The opposing VPI-MAC table 25 of the converter A is configured to store the destination MAC addresses, external VPIs, internal VPIs, and opposing MAC addresses in correspondence, but in the initial state is not set with MAC addresses etc.

The converter A, as shown in FIG. 11, registers, by command, the MAC addresses BBBBB and CCCCC of the converters B and C as opposing MAC addresses in the address translation table 24 and registers, by command, the MAC addresses BBBBB and CCCCC of the converters B and C as destination MAC addresses, the external VPI, internal VPI, and its own MAC address AAAAA as the opposing MAC address in the opposing VPI-MAC table 25. As the processing steps in FIG. 10, as shown by the one-dot chain arrows (a) and (b), the control processing unit 21 performs control for setting addresses in the address translation table 24 and opposing VPI-MAC table 25.

When the processing for setting and registering addresses ends, the control processing unit 21 accesses the opposing VPI-MAC table 25 (c), reads out the registered content (d), generates a frame based on the destination MAC address (e), and transmits this through the LAN interface 23 (f). In this case, the processing unit 21 can transmit a VPI-MAC resolution frame including a destination MAC address, source MAC address, type (VPI-MAC resolution type), request type (reply), and internal VPI.

Due to this, the converter B can receive a frame of the destination MAC address: BBBBB and form an address translation table 24 set with the external VPI: 110, internal VPI: 70, and opposing MAC address: AAAAA, while the converter C can receive a frame of the destination MAC address: CCCCC and form an address translation table 24 set with the external VPI: 111, internal VPI: 71, and opposing MAC address: AAAAA.

Therefore, after this, when the ATM interface 22 of the converter A receives a cell from the ATM network of the external VPI: 100, the control processing unit 21 refers to the address translation table 24, generates a frame changed from the VPI of the header of the cell to the internal VPI: 70 and added with the opposing MAC address: BBBBB, and transmits this from the LAN interface 23 to the LAN. The converter B receives this frame from the LAN interface 23, removes the MAC address, changes the internal VPI: 70 of the header of the cell to the external VPI: 110, and transmits this cell from the ATM interface 22 to its ATM network.

Further, the address translation table 24 of the converter is set and registered with an MAC address corresponding to the external VPI and internal VPI. Due to this, a plurality of ATM networks are connected through the LAN to form a network system and cells of the ATM networks can be transferred as frames in the LAN. Further, in the LAN, it is possible to use a frame of an address configuration using the IPv6.

While the invention has been described with reference to specific embodiments chosen for purpose of illustration, it should be apparent that numerous modifications could be made thereto by those skilled in the art without departing from the basic concept and scope of the invention.

The invention claimed is:

1. A converter connecting its network with a plurality of other networks by a LAN, comprising:
    an address translation table storing external VPI/VCIs showing destinations of cells transmitted by the networks, internal VPI/VCIs assigned uniquely to the LAN, and opposing MAC addresses for opposing converters connected to the LAN in correspondence; and
    a control processing unit for performing control for transmitting, to the LAN, frames changed from the external VPI/VCIs of headers of cells from its network to the internal VPI/VCIs by referring to the address translation table and having opposing MAC addresses corresponding to the internal VPI/VCIs attached, removing the opposing MAC addresses of frames received from the LAN by referring to the address translation table, and transmitting cells changed from internal VPI/VCIs to external VPI/VCIs to its network.

2. A communication control method in a network system comprised of a plurality of networks connected by converters to a LAN, comprising:
    having each converter be provided with an address translation table and a control processing unit, broadcast, to the LAN, a special frame including an internal VPI/VCI corresponding to an external VPI/VCI indicating the destination of a cell transmitted from the network and uniquely assigned to the LAN and its own MAC address,
    having a converter recognizing the internal VPI/VCI of the special frame and receiving the frame transmit, to the LAN, a reply frame having a source MAC address of the special frame as a destination MAC address and having its own MAC address as a source MAC address,
    having the converter receiving the reply frame register and set in an address translation table the external VPI/VCI, the internal VPI/VCI, and the source MAC address of the reply frame as the opposing MAC address in correspondence;
    transmitting said special frame including said internal VPI/VCI in an IPv6 address to said LAN; and
    receiving a reply frame from a converter corresponding to said internal VPI/VCI to construct said address translation table.

3. A communication control method in a network system comprised of a plurality of networks connected by converters to a LAN, comprising:

having each converter be provided with an address translation table and a control processing unit, broadcast, to the LAN, a special frame including an internal VPI/VCI corresponding to an external VPI/VCI indicating the destination of a cell transmitted from the network and uniquely assigned to the LAN and its own MAC address, having a converter recognizing the internal VPI/VCI of the special frame and receiving the frame transmit, to the LAN, a reply frame having a source MAC address of the special frame as a destination MAC address and having its own MAC address as a source MAC address, having the converter receiving the reply frame register and set in an address translation table the external VPI/VCI, the internal VPI/VCI, and the source MAC address of the reply frame as the opposing MAC address in correspondence; and having said converter periodically transmit said special frame to said LAN, receive a reply frame of said special frame, and set and register it in said address translation table.

* * * * *